United States Patent
D'Argenio et al.

(10) Patent No.: US 9,990,105 B2
(45) Date of Patent: Jun. 5, 2018

(54) ACCESSIBLE CONTEXTUAL CONTROLS WITHIN A GRAPHICAL USER INTERFACE

(71) Applicant: Verizon Patent and Licensing Inc., Arlington, VA (US)

(72) Inventors: Michael J. D'Argenio, Green Brook, NJ (US); Lonnie Hiroshi Katai, Murphy, TX (US); Alice Yuan Bain, Morristown, NJ (US); Kristopher T. Frazier, McKinney, TX (US); William Andrew Fish, Bedminster, NJ (US); Richard E. Sodon, West Milford, NJ (US); Jennifer Yu, San Mateo, CA (US); Sheryl Soo, San Francisco, CA (US); Janette Markel, San Francisco, CA (US); Harry Lawson Kight, San Francisco, CA (US); Andrew Allen Haskin, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 424 days.

(21) Appl. No.: 14/325,782

(22) Filed: Jul. 8, 2014

(65) Prior Publication Data
US 2016/0011725 A1    Jan. 14, 2016

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01)

(58) Field of Classification Search
CPC . G06F 3/0482; G06F 3/04842; G06F 3/04847
See application file for complete search history.

(56) References Cited

U.S. PATENT DOCUMENTS

| | | | |
|---|---|---|---|
| 9,690,476 B2* | 6/2017 | Shirzadi | G06F 3/04883 |
| 2003/0020671 A1* | 1/2003 | Santoro | G06F 3/0481 345/1.3 |
| 2008/0057926 A1* | 3/2008 | Forstall | G06F 3/0482 455/415 |

(Continued)

OTHER PUBLICATIONS

Decode Define Decode at Dictionary.com http://www.dictionary.com/browse/decode.*

(Continued)

*Primary Examiner* — Abdullah Al Kawsar
*Assistant Examiner* — Sean Hsiao

(57) ABSTRACT

A user device may provide a graphical user interface which presents content navigation objects, where each content navigation object may be associated with a content item and is presented within a portion of the graphical user interface. The user device may detect an action that corresponds to a content navigation object, and determine whether the detected action is a command to display content options that may be contextually related to the content item associated with the content navigation object. The user device may display the content options by altering the appearance of the content navigation object, receive an action selecting the content option from the displayed content options, and conceal the content options after the action for selecting the content option has been received.

25 Claims, 11 Drawing Sheets

(56) References Cited

U.S. PATENT DOCUMENTS

| | | | | |
|---|---|---|---|---|
| 2008/0318616 | A1* | 12/2008 | Chipalkatti | H04W 12/08 455/550.1 |
| 2009/0147771 | A1* | 6/2009 | Seal | H04M 1/2535 370/352 |
| 2009/0249247 | A1* | 10/2009 | Tseng | H04M 1/72552 715/808 |
| 2010/0159994 | A1* | 6/2010 | Stallings | G06F 3/0482 455/566 |
| 2010/0262928 | A1* | 10/2010 | Abbott | G06F 3/04817 715/769 |
| 2011/0167382 | A1* | 7/2011 | van Os | G06Q 10/109 715/800 |
| 2012/0254777 | A1* | 10/2012 | Liu | G06F 3/0481 715/762 |
| 2012/0306659 | A1* | 12/2012 | Ben-Dayan | G08B 21/0261 340/686.1 |
| 2013/0007665 | A1* | 1/2013 | Chaudhri | G06F 9/4443 715/830 |
| 2013/0210396 | A1* | 8/2013 | Deshpande | H04W 4/06 455/414.1 |
| 2013/0268529 | A1* | 10/2013 | Butts | G06F 17/30595 707/736 |
| 2014/0122605 | A1* | 5/2014 | Merom | G06Q 10/10 709/204 |
| 2014/0229839 | A1* | 8/2014 | Lynch | G06F 9/44505 715/736 |
| 2014/0337748 | A1* | 11/2014 | Lee | G06F 3/1454 715/740 |
| 2015/0026598 | A1* | 1/2015 | Ho | H04M 1/725 715/753 |
| 2015/0149644 | A1* | 5/2015 | Shin | H04L 67/14 709/227 |
| 2015/0317066 | A1* | 11/2015 | Saxena | G06F 3/04842 715/739 |
| 2015/0350143 | A1* | 12/2015 | Yang | G06F 3/0482 345/173 |
| 2015/0350147 | A1* | 12/2015 | Shepherd | H04L 51/24 715/752 |

OTHER PUBLICATIONS

IOSVlog Daily "Quick Reply for Messages—iOS 8 New Feature", published on Jun. 3, 2014 by iOSVlog, https://www.youtube.com/watch?v=HCL6rlaXuLg.*

* cited by examiner

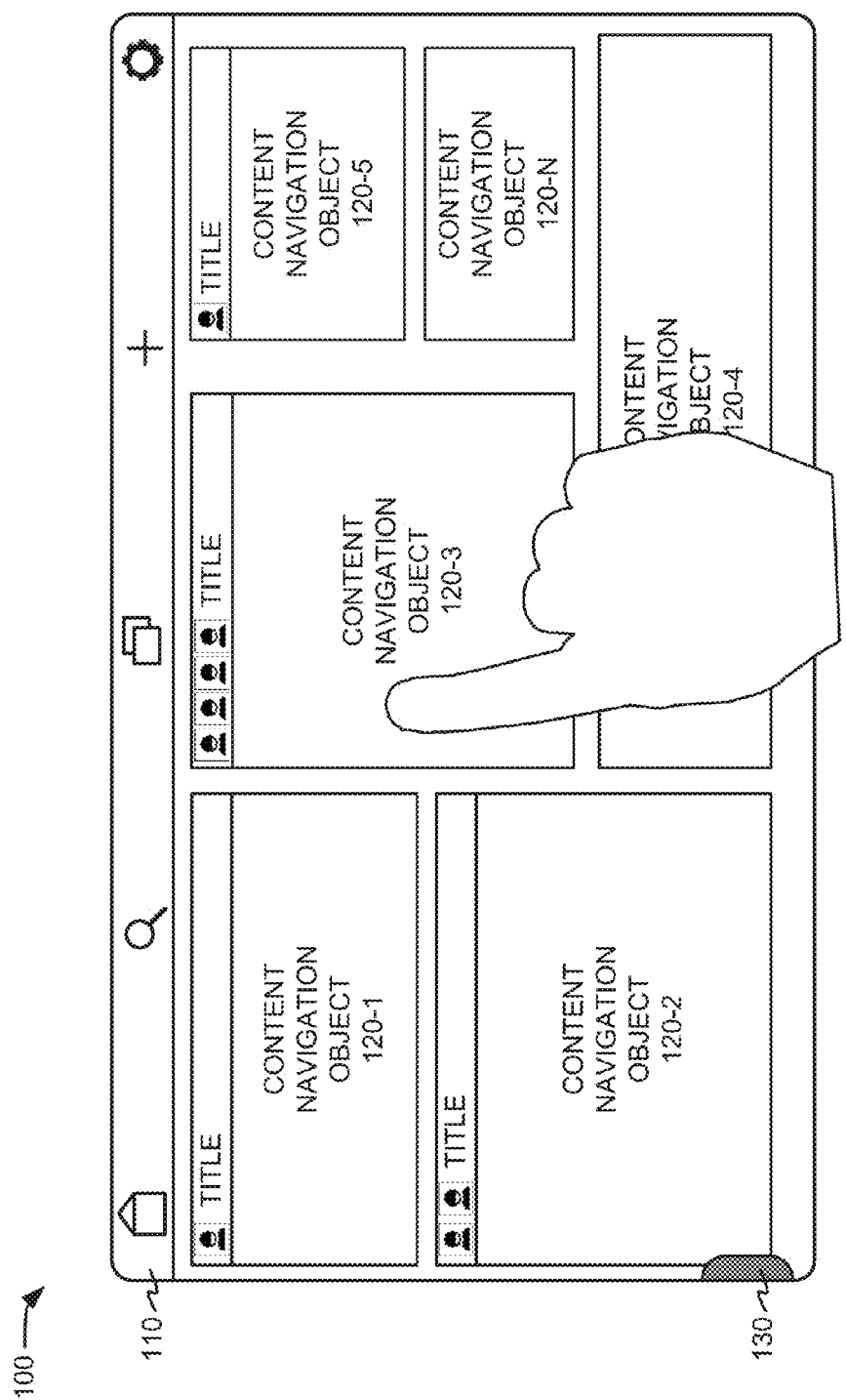

ACCESSIBLE CONTEXTUAL CONTROLS WITHIN A GRAPHICAL USER INTERFACE

BACKGROUND

A user device may include a display allowing a user to view a wide variety of content items which may be based on different data types. The display may show information in the form of text, images, graphic objects, bitmaps, video, audio controls, etc. The display may also provide graphic objects which can serve as Graphical User Interface (GUI) widgets permitting user content interaction and control. However, conventional approaches for displaying and controlling content in a simple, accessible manner can present challenges as the number of content options increase and/or the display sizes become limited to sizes consistent with mobile devices. Conventional user interfaces may include formats such as nested menus that may require a user to "drill down" through multiple menus to make a selection.

BRIEF DESCRIPTION OF THE DRAWINGS

FIGS. 1A and 1B are diagrams illustrating an embodiment of a graphical user interface using accessible contextual controls;

DETAILED DESCRIPTION OF PREFERRED EMBODIMENTS

Figure 1B:
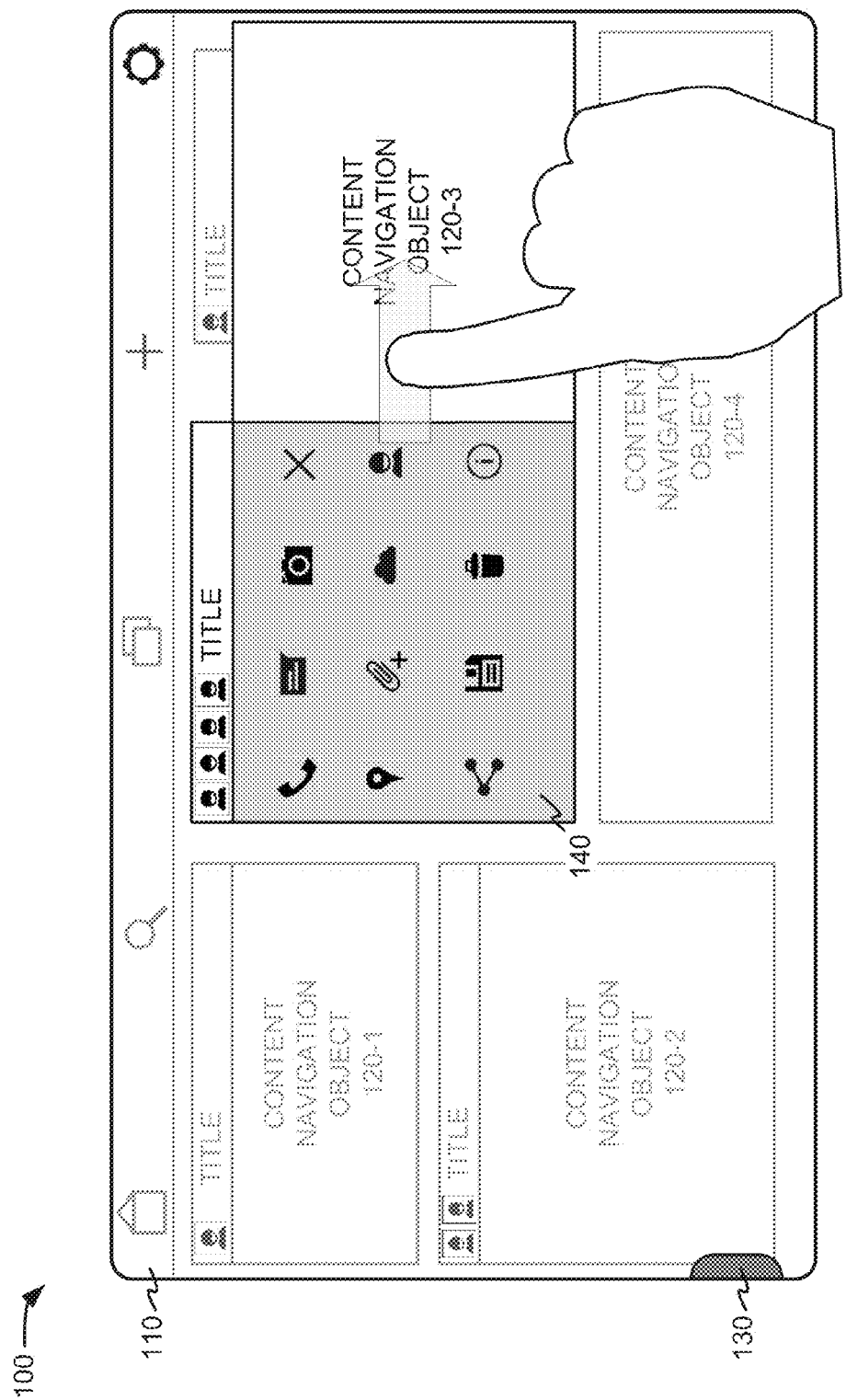

The following detailed description refers to the accompanying drawings. The same reference numbers in different drawings may identify the same or similar elements.

Devices and methods described herein include graphical user interfaces (GUIs) for quickly accessing content items and providing options for performing associated actions. The content items may be presented for selection by the user in a GUI using content navigation objects. A content navigation object may be presented to quickly identify its association with a particular content item, and can be acted upon by a user as graphical control to quickly perform various actions/functions associated with the content item. These actions are presented to the user as selectable content options, where the presentation of the content options may depend upon one or more contextual relationships with their associated content items. The presentation of the content options may be contextual and vary in a dynamic manner, where the display of the content option can be a function of content type and/or its associated application. The display of the content options may also depend upon the state(s) of a user device when the navigation content object was activated to display the content options. For example, the state(s) of the user device may include one or more of the time, position, velocity, etc. of the mobile device. Thus, a content navigation object may receive commands to access its associated content item, display selectable content options that are related to the content item, and receive a selection for a specific content option which may be provided by the user. The content navigation object is designed so these selections may be made in a quick and convenient manner, and may be performed without having to go through an extra step of launching a separate application to perform the desired action on the content item.

The term "content item" may be generally defined herein as any data record or object (e.g., an electronic file) storing or otherwise associated with content, which may include electronic data representative of text, one or more messages (e.g., short message service ("SMS") messages, email messages, or multimedia message service ("MMS") messages), contact information associated with any form of electronic communication (e.g., email, video conferencing, SMS messaging, etc.), one or more symbols, one or more graphics, one or more images (e.g., digital photographs and video frames), video, audio, multimedia, video games, or any segment, component, or combination of these or other forms of electronic data that may be viewed or otherwise experienced by a user.

The term "content navigation object" may be generally defined herein as a GUI control which is associated with a particular content item. A content navigation object may be displayed to represent its associated content item, as will be described in more detail below. A content navigation object may also receive a number of different actions from the user which may be interpreted as commands. In an embodiment, one action may display a number of content options that may be contextually related to the content item associated with the content navigation object. The process of displaying the content options may only require a simple action by the user, and not cause the focus of the user to be switched to a new screen in the display. Graphical animations may be used in displaying the content options, so it appears they are being "revealed," for example, from a layer beneath the content navigation object. Thus content options would be conveniently accessible to the user. The content navigation object may also receive other actions, such as, for example, an action to launch a default application for the associated content item for further processing by the user, as will also be described in more detail below.

The term "content option" may be generally referred to herein as any user-selectable action that may be performed on or in association with the content item. As will be explained in more detail below, embodiments presented herein will present content options in an intelligent manner, and are thus contextually related to the content item based on predefined rules, metadata, and/or state information of a user device. Content options may include user-selectable actions allowing the user to quickly launch an application associated with the content item, where the application may be an alternative to the default application which may be selected by other actions (e.g., directly through the content navigation object).

The term "metadata" may be generally referred to herein as any electronic data descriptive of content and/or content items. For example, metadata may include, but is not limited to, content item identifiers (e.g., file names), time data, location data, user data, source data, destination data, size data, creation data, modification data, data structure data, and access data descriptive of content and/or one or more content items. Examples of metadata may include time data associated with a data operation (e.g., creating, modifying, deleting, receiving, or sending content), location data associated with a data operation (e.g., a geographic or network location at which content is created), user data identifying one or more users associated with content (e.g., a user who created, modified, deleted, sent, received, accessed, or otherwise operated on or is the owner of content), content type information (e.g., file type or other predefined category of content), content transport information, source data associated with a source of content (e.g., a user from whom content is received), and destination data associated with a destination to which content is sent (e.g., a user to whom content is transmitted).

Accordingly, embodiments provided herein may allow a user to quickly access content items and content options using only a few user actions. By providing content options which are contextually related to the content item being presented, the number of accessible options may be reduced, which can simplify the user interface and may make it more suitable to the smaller displays of mobile devices.

FIGS. 1A and 1B are diagrams illustrating an embodiment of a graphical user interface (GUI) 100 using accessible contextual controls. With respect to FIG. 1A, GUI 100 may include a static command bar 110 for accessing common controls and/or commands that are not dedicated to any one content navigation object. Static command bar 110 may include may include controls to jump to a home screen, search across content items, copy content items, add/delete content items, and/or access settings. GUI 100 may further include a plurality of content navigation objects 120 (herein referred to collectively as "content navigation objects 120" and individually as "content navigation object 120-*x*"). GUI 100 may also include a control tab 130 to access a contacts panel, which is further described below in relation to an embodiment shown in FIGS. 2A and 2B. GUI 100 may be presented using a touch-screen display where user inputs may be provided by touch gestures. However, instead of using a touch-screen, various embodiments may accept input using other conventional approaches, such as, for example, a mouse, a track pad, a keyboard, one or more cameras, a voice command, and/or a gesture recognition device.

GUI 100 may present multiple content navigation objects 120 which may be displayed as rectilinear objects and arranged in a pattern where the content navigation objects 120 appear as "tiles." As noted above, the content navigation objects 120 are associated with content items, and some content navigation objects may be displayed as a representation of their associated content item for easy identification by the user, as will be described in more detail below. Content navigation objects 120 may receive different types of inputs to perform actions on their associated content items. For example, in an embodiment shown in FIG. 1A, content navigation object 120-3 may receive an input, such as, for example, a touch or a tap, to launch a program which uses as input the content item associated with content navigation object 120-3. In addition, as shown in FIG. 1B, content navigation object 120-3 may receive a different input, such as, for example, a sliding action, to display content options for performing additional operations on the content item associated with content navigation object 120-3. The content options presented may be contextually related to the content item, and may include, for example, actions to respond, share, post, call, send message, leave a voice mail, launch a separate application etc., for the content item associated with content navigation object 120-3. This approach provides quick access to the content options that may be specific to the content item of interest without having to leave the screen, thus saving steps for the user wishing to perform actions on the content item.

Further referring to FIG. 1A, exemplary details regarding content navigation objects 120 are provided. In one example, content navigation object 120-1 may be associated with a content item that is a text message. In a smaller upper portion, content navigation object 120-1 may display a title that includes a small image of the person who sent the text message, along with adjacent text indicating the sender's name. In a larger area below the title, content navigation object 120-1 may display the actual text of the message. In another example, content navigation object 120-2 may be associated with a content item such as a digital photograph shared over a social network. Content navigation object 120-2 may have a title that includes small images of the "friends" who shared the digital photograph along with their names. A scaled image of the digital photograph may be shown in the larger area below the title in content navigation object 120-2. Additionally, the user may provide a command (e.g., such as a touch or a tap on the scaled image) of content navigation object 120-2 to display a full resolution version of the digital photograph in an appropriate image application on the user device.

In another example, content navigation object 120-3 may be associated with a content item such as a digital video provided over an email distribution list. Content navigation object 120-3 may have a title that includes small images of individuals in the distribution list who shared the digital video, along with name of a group representing the distribution list. A representative frame of the video may be shown in the larger area below the title in content navigation object 120-3. The user may provide a command to content navigation object 120-3 (such as a touch or a tap on the representative video frame) to play the received digital video in the appropriate video application. In yet another example, content navigation object 120-4 may be associated with a content item that is a voice message and may display a picture of the person who left the message and/or a picture of the audio waveform of the voice message. Content navigation object 120-4 may also present a controller to play, pause, and/or perform high speed scrubbing of the voice message. In another example, content navigation object 120-5 may be associated with a content item referring to a location shared via email, and have a title that includes a small image of the person who sent the email, along with adjacent text providing the sender's name. In the larger area below the title, content navigation object 120-5 may display a graphic showing the location on a map. Other content navigation objects 120-N may presented to provide access and/or content options regarding any type of content item not specifically mentioned above.

Further referring to FIG. 1B, the user may act upon content navigation object 120-3 in a specific manner to display content options for the content item associated with content navigation object 120-3. As shown in FIG. 1B, the user may, for example, "slide" content navigation object 120-3, using a finger, a stylus, or a cursor controlled by a mouse or track-pad, to display a group of content options 140. The action for displaying the group of content options 140 may appear to "reveal" content options 140 to the user, and also can be associated with altering the display of the other aspects of GUI 100 (e.g., displaying the other content navigation objects 120 in a faded manner) to emphasize the group of content options 140. Content options 140 may be displayed with representative icons (as shown in FIG. 1B) and/or with text designations. Any content option in group of content options 140 may selected by the user to perform an action on the associated content item. For example, the user may simply touch one of the displayed content options to perform a desired action. Once the content option is selected, the navigation control object 120-3 may, for example, "slide" back to its original position.

It should be noted that other user and graphic actions may be used for displaying group of content options 140. For example, a user may provide a rotation and/or flip action which rotates/flips content navigation object 120-3 to display content options 140. Alternatively, the user may use multiple taps or some multi-touch gesture to "shrink" or "expand" content navigation object 120-3, and to cause it fade away or become transparent for displaying content options 140. In any event, the content navigation object 120-3 may return to its original appearance (e.g., as illustrated in FIG. 1A) once a content option is selected by the user.

Displayed content options 140 may be contextually related to the content item, and may include, for example, actions to call or leave a voice mail, send a message, respond with a photo/video, delete, geotag, attach a file, store in a cloud server, associate with a contact, share via a social network, save, delete, obtain information, etc., for the content item associated with content navigation object 120-3. Content options 140 may include user-selectable actions allowing the user to quickly launch an application associated with the content item, where the application may be an alternative to the default application which may be selected by other actions (e.g., directly through the content navigation object).

Contextual relationships between displayed content options 140 and the content items may be based on metadata associated with the content items, state information of the user device and/or the identity of the user device when the content options are displayed, and/or conditions which define relationships between appropriate actions and content items. Thus, content options 140 may change in a dynamic manner. The metadata may include information about the type of content item, such as, for example, whether the content item represents an image, a message, a video, contact information, etc. Metadata may also include additional descriptive information regarding the content item and/or its mode of delivery, which may include, for example, content application source, creator identification, time/place created, time/place sent, etc. Metadata may further include state information of the user device when the content options were displayed. This type of metadata could include, for example, the time, position, velocity, battery charge state, information produced by a sensor within user device (such as, for example, a camera and/or microphone), etc., of the user device when the content options are displayed. As will be described in more detail below, the conditions defining contextual relationships between appropriate actions and content items may be heuristic rules, which may be predefined by the device manufacturer, predefined by the user, and/or learned based upon the user's prior interactions with the user device.

Figure 2A:
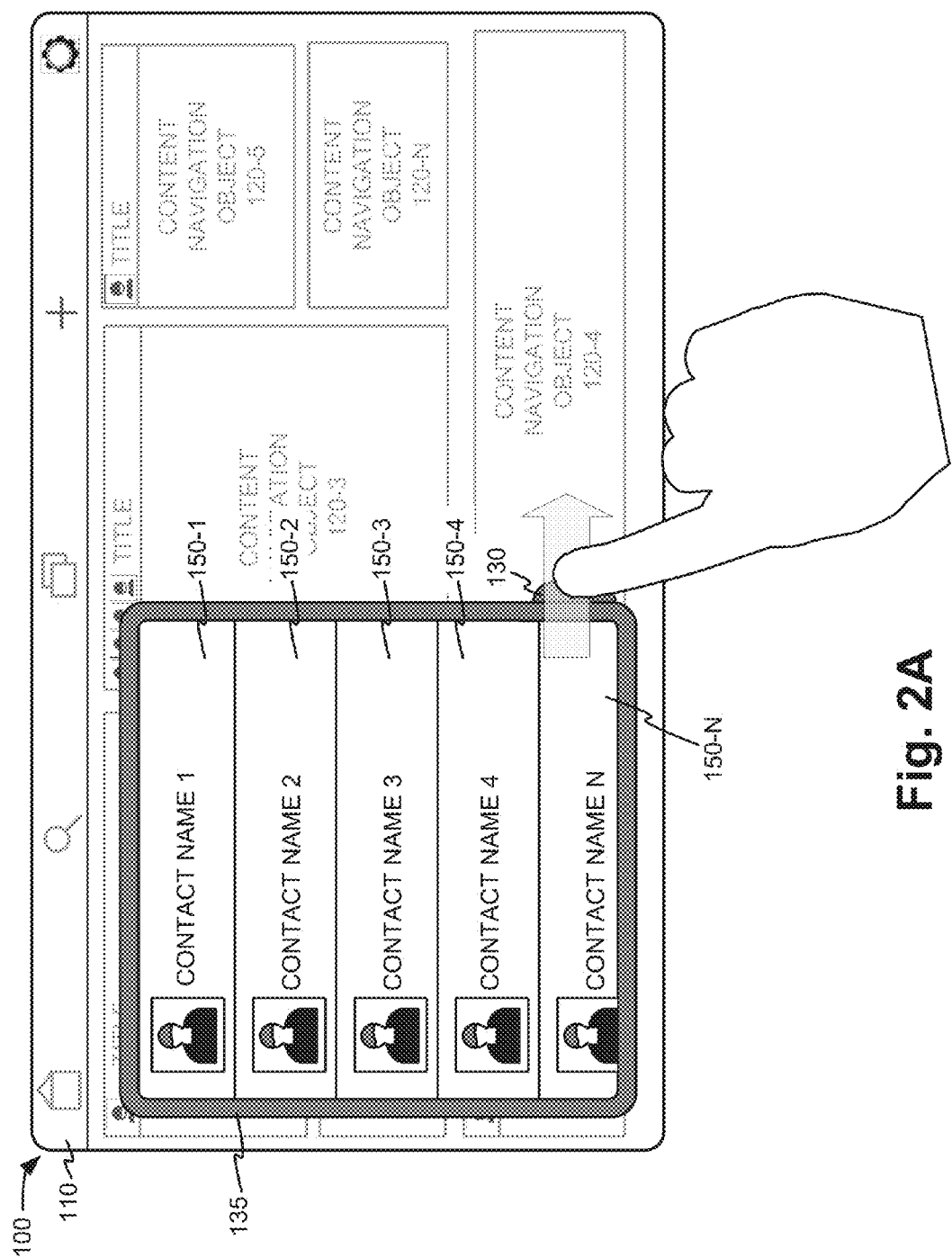
FIGS. 2A and 2B are diagrams illustrating an embodiment of a graphical user interface using accessible contextual controls for contacts information.
Figure 2B:
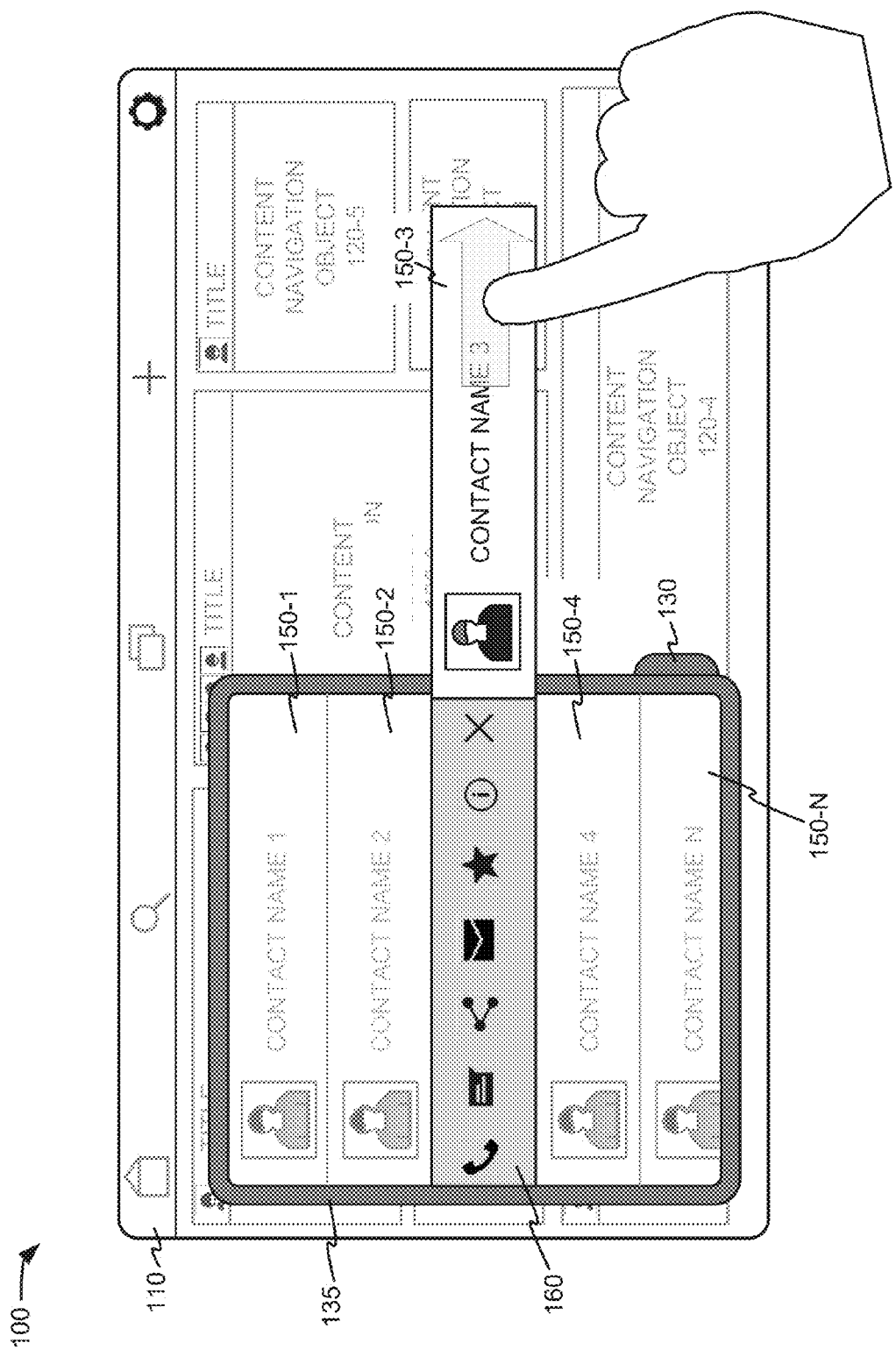

FIGS. 2A and 2B are diagrams illustrating an embodiment of a graphical user interface using accessible contextual controls for contacts information. In an embodiment, a user may have quick access to a plurality of contacts which may be displayed in a contacts panel 135. In one embodiment, contacts panel 135 may be hidden from view until displayed by having the user select control tab 130 in a prescribed manner. In some embodiments, control tab 130 may be present at all levels of the user experience, and thus can be shown in all screens displayed by the user device, as depicted in FIGS. 1A and 1B. Thus, control tab 130 may be available in screens generated by the operating system (e.g., the home screen) and screens generated by other applications, including communication applications (e.g., messaging, phone, video conferencing, social networking applications, etc.). In other embodiments, control tab 130 may only become visible when communication applications are running in the foreground.

The user may display contacts panel 135 by activating control tab 130. As shown in FIG. 2A, where a touch screen may be used, the user may activate control tab 130 based on a touch command, such as, for example, using a sliding motion. In other embodiments, other actions may display contacts panel 135 in different manners. For example, a tap on control tab 130 may display contacts panel 135 by fading in, and a subsequent tap on control tab 130 may obscure contacts panel 135 by fading out. In further embodiments, the contacts panel 135 may be displayed automatically (e.g., without the user invoking control tab 130) when appropriate communication applications are initially launched and/or upon being switched from the background to the foreground. In other embodiments, user inputs may be received from other input devices, such as, for example, a mouse, a track-pad, or other gesture recognition device. Alternatively, or in addition to a touch screen or other input device, activation of control tab 130 by be performed based on voice commands received from one or more microphones, or other commands received from one or more cameras.

When displayed, contacts panel 135 may show a group of content navigation objects specifically designated as contact navigation objects 150 (herein referred to collectively as "contact navigation objects 150" and individually as "contact navigation object 150-$x$"). Thus, contact navigation objects 150 may be a special class of content navigation objects 120 that are associated with content items that relate to contact information (hereinafter referred to as contact items). For example, such contact items may be implemented as vCard files, used, for example, with electronic business cards. Displaying the contacts panel 135 may further be associated with altering the display of the other aspects of GUI 100 (e.g., displaying the other content navigation objects 120 in a faded manner) to emphasize a group of contact navigation objects 140. Contact navigation objects 150 may be displayed to represent their associated contact information by, for example, displaying a picture of the contact and/or the name of the contact.

Embodiments may dynamically determine which contact navigation objects (e.g., which list of names) to display based on context information, which be inferred through state information data of the device (e.g., time, position, velocity, ambient conditions, etc.), metadata associated with the contact items, and/or prior usage history. The metadata associated with the contact items may include, for example, the relationship of the user to the contact (e.g., personal, business, friend, family, etc.), the preferred mode of communication with the contact (e.g., phone, text message, email, video conference, etc.), information regarding the person represented in the contact item (e.g., birthday, interests, groups, business associations, etc.). Thus, the group of contact navigation objects 150 presented in the contacts panel 135 at any one time may typically represent only a subset of the contact information available to the user through the user device. Accordingly, the group of contact navigation objects 150 may be presented in an intelligent and dynamic manner to improve the efficiency of GUI 100 and permit the user to focus on the most relevant contact information within an appropriate context. Embodiments may accordingly present contact information which is important to the user at the appropriate time and place, which also may be further tailored to the form of communication being currently used or that is preferred by the user. For example, the group of contact navigation objects 150 presented may be displayed based on the type of communications application which is running in the foreground. Thus, only contact navigation objects 150 associated with contact information specific to a particular mode of communication application (e.g., text messaging) may be displayed. In another embodiment, the contact navigation objects 150 may be based on the prior usage patterns or prior usage history of the user. For example, contacts panel 135 may present contact navigation objects 150 corresponding to contacts associated with a contact history of a user stored in logs across all communications applications on a user device. Such history may include, for example, call history logs, text messaging logs, video messenger logs, etc. In another embodiment, contacts panel 135 may present contact navigation objects 150 for a "call history" associated only with a particular communication application currently in the foreground. For example, the displayed contact navigation objects 150 may represent a list of people the user recently called and/or received a call, sent and/or received a message, sent and/or received a voice mail, conducted a video conference, etc. Prior history may also include contact "address books" which may consolidate contacts, over one or more modes of communication, and can be stored on the user device and/or at data center 320 (FIG. 3) (e.g., an offsite and/or cloud server).

In other embodiments, the contacts panel 135 may present contact navigation objects 150 based on various state information of the user device. In some embodiments, contact navigation objects 150 may appear based on the time and/or location of the user device. For example, a user departing from home in the morning may have contacts panel 135 populated with work contacts based on prior usage. In another example, a user departing from work in the evening may have contacts panel 135 populated with family contacts based on prior usage. Thus, the group of contact navigation objects 150 appearing in contacts panel 135 may be dynamically formed using conditions (e.g., logic, heuristic rules, etc.) which can be based on prior usage history data, metadata, and/or state information data of the user device.

As noted above, the contact navigation objects 150 which populate contacts panel 135 are associated with contact items. The contact items may be stored previously on the user device and/or a remote server (e.g., a cloud server). The contact items may also be generated dynamically based on the usage history of the device, such as, for example, create contact items when the user initiates communications with new contacts, and/or when the user receives communications from new contacts through the user device.

Referring to FIG. 2B, a user may act upon contact navigation objects 150 displayed in contacts panel 135 to display content options which may perform actions on the contact item (i.e., in this embodiment, the contact item relates to any form of contact information). For example, a user may specify an action on content navigation item 150-3 in a specific manner to display content options 160 for the contact item associated with content navigation object 150-3. As shown in FIG. 2B, the user may, for example, slide contact navigation object 150-3 to display a group of content options 160, which may be used to perform various contact related actions on the associated contact item. The action for displaying the group of content options 160 may further be associated with altering the display of the other aspects of GUI 100 (e.g., displaying the other contact navigation objects 150 in a faded manner) to emphasize the displayed content options 160. Any content option in group of content options 160 may be selected by the user to perform an action on the associated contact item. Content options 160 may be displayed with representative icons (as shown in FIG. 2B) and/or with text designations. For example, the user may simply touch one of the displayed content options 160 to perform a desired action. Once the content option is selected, the navigation control object 150-3 may, for example, slide back to its original position. It should be noted that other user and graphic actions may be used for displaying group of content options 160, as described above in relation to the embodiment shown in FIG. 2B.

Displayed content options 160 may be contextually related to the contact item associated with contact navigation object 150-3. Content options 160 may include, for example, actions to call or leave a voice mail, send a text message, contact via a social network, send an email, indicate the contact is a favorite, obtain information for contact, etc., for the contact item associated with contact navigation object 150-3. In one example, content options 160 may be used as an alternative mode of communication by launching a different application than the default application associated with the contact item. For example, if contacts panel 135 appears when a text messaging application is running in the foreground, simply tapping on a contact navigation object may allow a text message to be sent to the associated contact. However, if the user wants to quickly select a different mode of communication, or a different application associated with the same mode of communication, the user may have the option of connecting with the same contact by displaying content options 160, and selecting a different mode of communications by "jumping" to a different communications application. In this example, when the text messaging application is running in the foreground, if the user wishes to call the contact associated with the contact navigation object 150-3, the user may first display content options 160 (e.g., by "sliding" contact navigation object 150-3 to the right) and then select the phone icon to call the contact associated with contact navigation object 150-3. As noted above for the content options in the embodiment shown in FIG. 2B, contextual relationships between displayed content options 160 and the contact items may be based on metadata associated with the contact items, state information of the user device when the content options are displayed, and/or conditions which define relationships between appropriate actions and contact items. Thus, content options 160 may change in a dynamic manner. For example, during work hours, content options 160 may populated with modes of communication the user historically uses for work when the contact is a work contact, and other modes of communication if the contact is a non-work contact. Specifically, for example, during work hours, a phone icon may be displayed for work contacts and a text messaging icon may be displayed for non-work contacts. However, in the evening, the phone icon may be present for a non-work contact, but not present for a work contact. In another example, when the user device is moving at vehicular speeds, icons for text messaging applications may not be displayed for any contacts in order to avoid distractions for the vehicle operator. The metadata may include information about the type of communication application(s) associated with the contact represented by the contact item, how and/or when the contact item was created, the relationship of the contact to the user (e.g., friend, family, business, etc.), description information regarding the contact (e.g., birthday, spouse name/contact) and connections to other related contact items. Metadata may further include state information of the user device when the content options were displayed. This type of metadata could include, for example, the time, position, velocity, etc., of the user device when the content options are displayed. As will be described in more detail below, the conditions defining contextual relationships between appropriate actions and contact items may be heuristic rules, which may be predefined by the device manufacturer, predefined by the user, and/or learned based upon the user's prior interactions with the user device.

Figure 3:
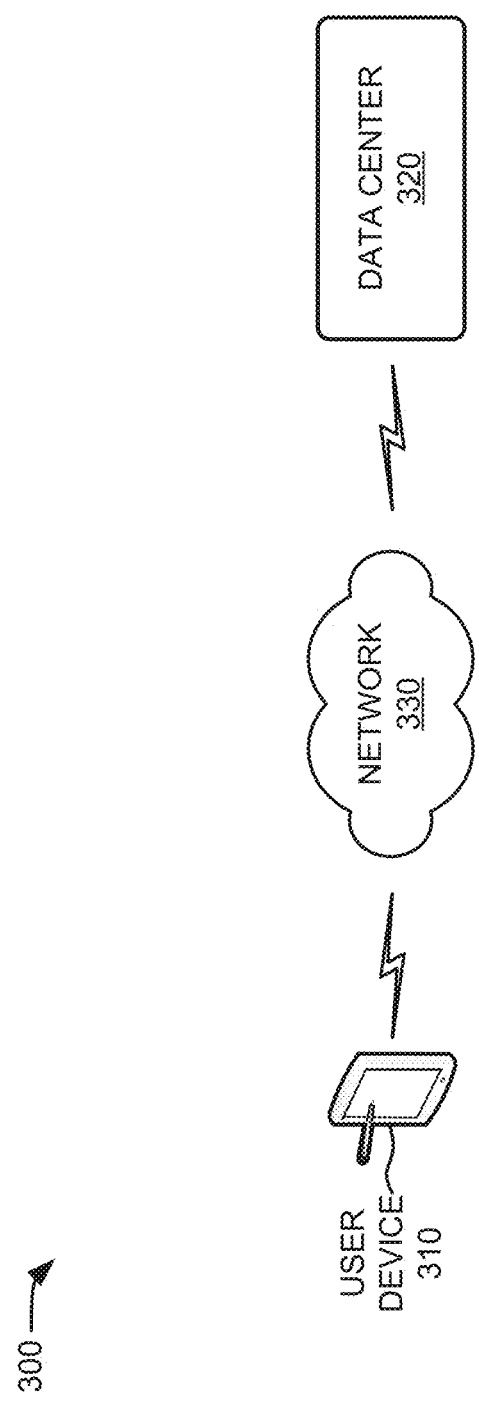
FIG. 3 is a diagram showing an exemplary environment of a user device which may implement concepts described herein.

FIG. 3 is a diagram showing an exemplary environment 300 of a user device 310 which may implement aspects described herein. As illustrated, network environment 300 may include a user device 310 and a data center 320 interconnected by a network 330. Components of network environment 300 may be connected via wired and/or wireless links.

User device 310 may include any computational or communication device. User device 310 may provide an opportunity for a user to experience (e.g., view, listen, read, etc.) content items and/or interact with other devices (e.g., associated with data center 320). For example, user device 310 may include a tablet computer, a personal computer, a smart phone, a personal gaming system, a music playing device, a global positioning system (GPS) unit, a network-connected television (e.g., so called "smart TV"), a cable television box, a video game, or other types of computation and/or communication devices. The interface of user device 310 for which a user interacts with the content may implement a touch or near-touch interface. However, other known interfaces, such as, for example, mouse, track pad, keyboard, gesture recognition, etc., may be used.

Data center 320 may include one or more network devices associated with a service provider and/or content provider. Data center 320 may collect and/or provide content that may be made available to user device 310. For example, data center 320 may combine various types of metadata with content items for which content options provided on a user device 310 may be based. For example, content options may be based on particular accounts and/or authentications associated with user device 310. In another embodiments, data center 320 may provide metadata directly to user device 310.

In embodiments described herein, data center 320 may perform backend services to support features of GUI 100 operating on user device 310. For example, data center 320 may provide content items based searches and/or communication commands based on input received from user device 310 and provide results to user device 310. Interactions between data center 320 and user device 310 may be performed, for example, using hypertext transfer protocol (HTTP) or secure HTTP (HTTPS) via network 330. In an embodiment, data center 320 may be a cloud server and/or other device which supports a cloud-based service.

Network 330 may include a local area network (LAN); an intranet; the Internet; a wide area network (WAN), such as a cellular network, a satellite network, a fiber optic network, a private WAN, or a combination of the Internet and a private WAN, etc., that is used to transport data. Although shown as a single element in FIG. 3, network 330 may include a number of separate networks that function to provide services to user device 310.

In FIG. 3 the particular arrangement and number of components of network environment 300 are illustrated for simplicity. In practice, network environment 300 may include more user devices 310, data centers 320, and/or networks 330.

Figure 4:
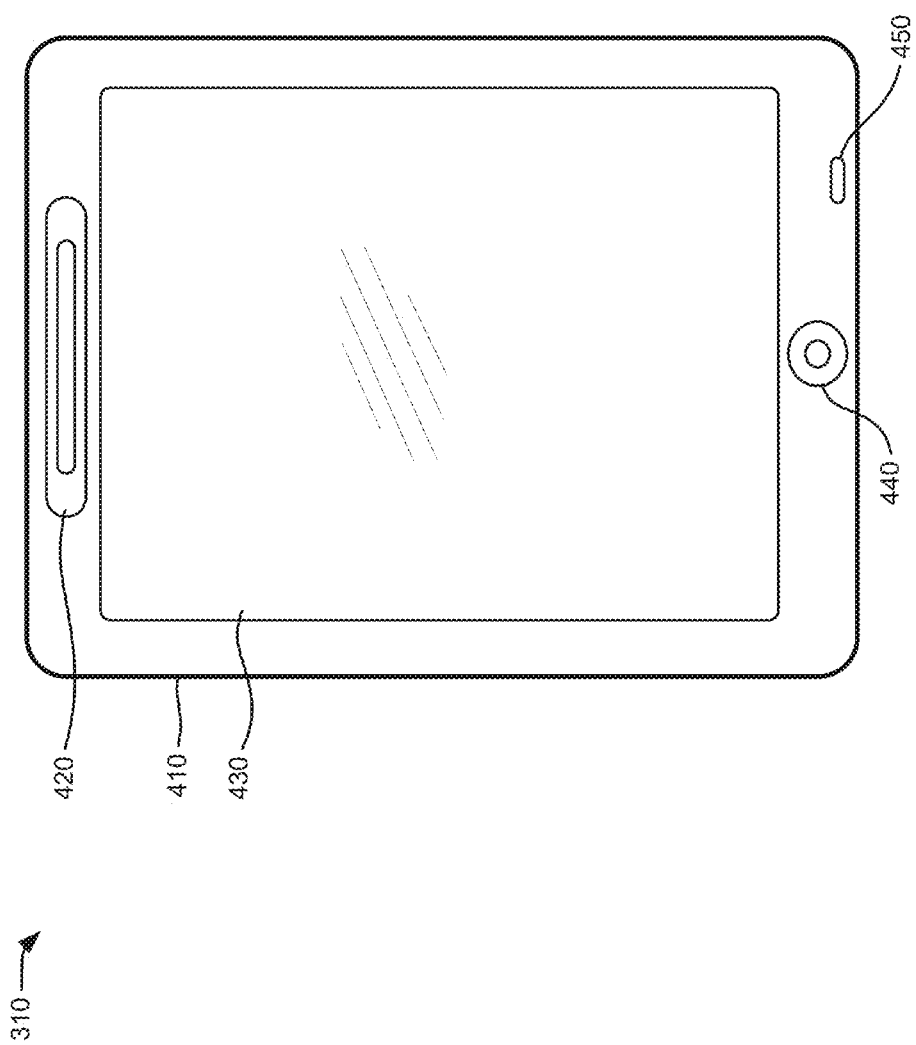
FIG. 4 is a diagram of an exemplary user device consistent with embodiments described herein.

FIG. 4 is a diagram of an exemplary user device 310 consistent with embodiments described herein. As illustrated in FIG. 4, user device 310 may include a housing 410, a speaker 420, a display 430, control button 440, and/or a microphone 450. Housing 410 may protect the components of user device 310 from outside elements. For example, housing 410 may be formed from plastic, metal, or a composite, and may be configured to support speaker 420, display 430, control button 440, and/or microphone 450.

Speaker 420 may provide audible information to a user of user device 310. Speaker 420 may be located in an upper portion of user device 310, and may function as an ear piece when a user is engaged in a communication session using user device 310. Speaker 420 may also function as an output device for audio information associated with games and/or video images played on user device 310.

Display 430 may provide visual information to the user. For example, display 430 may display text, images, video, and/or graphics received from another device, and/or relating to applications executed on user device 310. Display 430 may include a liquid crystal display (LCD), such as a thin film transistor (TFT) LCD, plasma display, etc.

In one implementation, display 430 may include a touch screen that may be configured to receive a user input when the user touches (or comes in close proximity to) display 430. For example, the user may provide an input to display 430 directly, such as via the user's finger, or via other devices, such as a stylus. User inputs received via display 430 may be processed by components and/or devices operating in user device 310. The touch-sensitive display 430 may permit the user to interact with user device 310 in order to cause user device 310 to perform one or more operations. Exemplary technologies to implement a touch screen on display 430 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 430 to be used as an input device. The touch-sensitive display 430 may also identify a duration of a touch and/or movement of a body part or a pointing device as it moves on or near the surface of the touch-sensitive display 430.

Control button 440 may permit the user to interact with user device 310 to cause user device 310 to perform one or more operations. For example, control button 440 may be used to cause user device 310 to close an application, transmit information, or to cancel a command.

Microphone 450 may receive audible information from the user, for example, in the form of voice commands. For example, microphone 450 may receive audio signals from the user and may output electrical signals corresponding to the received audio signals.

Although FIG. 4 shows exemplary components of user device 310, in other implementations, user device 310 may contain fewer, different, differently-arranged, or additional components than depicted in FIG. 4. For example, in one implementation, user device 310 may also include an integrated or detachable keyboard. In still other implementations, a component of user device 310 may perform one or more tasks described as being performed by another component of user device 310.

Figure 5:
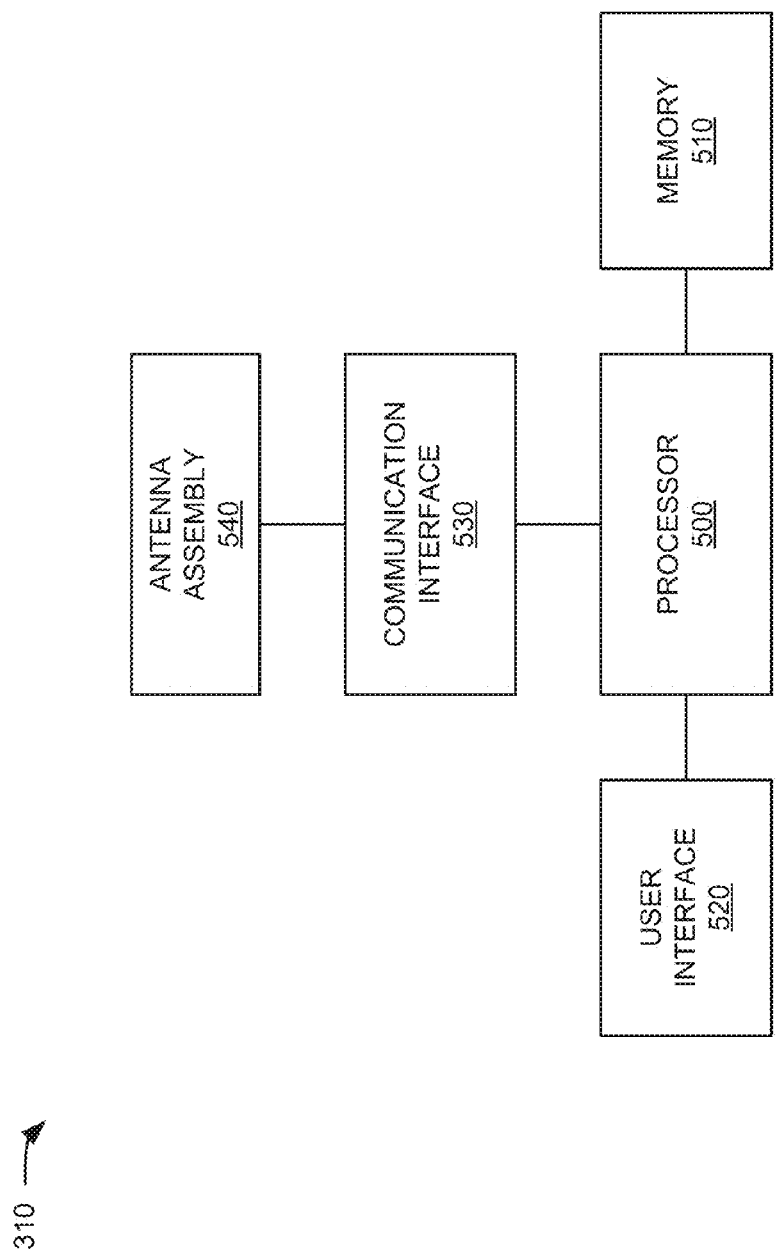
FIG. 5 is a block diagram of exemplary components of the user device illustrated in FIG. 4.

FIG. 5 is a block diagram of exemplary components of user device 310 shown in FIG. 4. As illustrated, user device 310 may include a processor 500, a memory 510, a user interface 520, a communication interface 530, and/or an antenna assembly 540. User device 310 may include other components (not shown) that aid in receiving, transmitting, and/or processing data. Moreover, other configurations of components in user device 310 are possible.

Processor 500 may include one or more processors, microprocessors, application specific integrated circuits (ASICs), field programmable gate arrays (FPGAs), or the like. Processor 500 may control operation of user device 310 and its components. In one implementation, processor 500 may control operation of components of user device 310 in a manner described herein.

Memory 510 may include a random access memory (RAM) or another type of dynamic storage device that may store information and instructions, e.g., an application, for execution by processor 500; a read-only memory (ROM) device or another type of static storage device that may store static information and instructions for use by processor 500; and/or some other type of magnetic or optical recording medium and its corresponding drive, e.g., a hard disk drive (HDD), for storing information and/or instructions. In one implementation, memory 510 may store instructions and/or data used to display a graphical user interface, such as graphical user interface 100 on display 530. Memory 510 may further store content items and metadata associated with the content items. In certain embodiments, content items and metadata may be stored using one or more suitable data entities and/or structures, including one or more relational or hierarchical data tables, for example. In other embodiments, metadata may be stored as part of the content items to which the metadata is associated.

User interface 520 may include mechanisms for inputting information to user device 310 and/or for outputting information from user device 310. Examples of input and output mechanisms might include buttons (e.g., control button 440, keys of a keypad, a joystick, etc.); a speaker (e.g., speaker 420) to receive electrical signals and output audio signals; a microphone (e.g., microphone 450) to receive audio signals and output electrical signals; a display (e.g., display 430) to receive touch input and/or to output visual information; a vibrator to cause user device 310 to vibrate; and/or a camera to receive video and/or images.

Communication interface 530 may include, for example, a transmitter that may convert baseband signals from processor 500 to radio frequency (RF) signals and/or a receiver that may convert RF signals to baseband signals. Alternatively, communication interface 530 may include a transceiver to perform functions of both a transmitter and a receiver. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network.

As will be described in detail below, user device 310 may perform certain operations in response to processor 500 executing software instructions contained in a computer-readable medium, such as memory 510. A computer-readable medium may include a non-transitory memory device. A memory device may include space within a single physical memory device or spread across multiple physical memory devices. The software instructions may be read into memory 510 from another computer-readable medium or from another device via communication interface 530. The software instructions contained in memory 510 may cause processor 500 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of user device 310, in other implementations, user device 310 may contain fewer, different, differently-arranged, or additional components than depicted in FIG. 5. In still other implementations, a component of user device 310 may perform one or more other tasks described as being performed by another component of user device 310.

Figure 6:
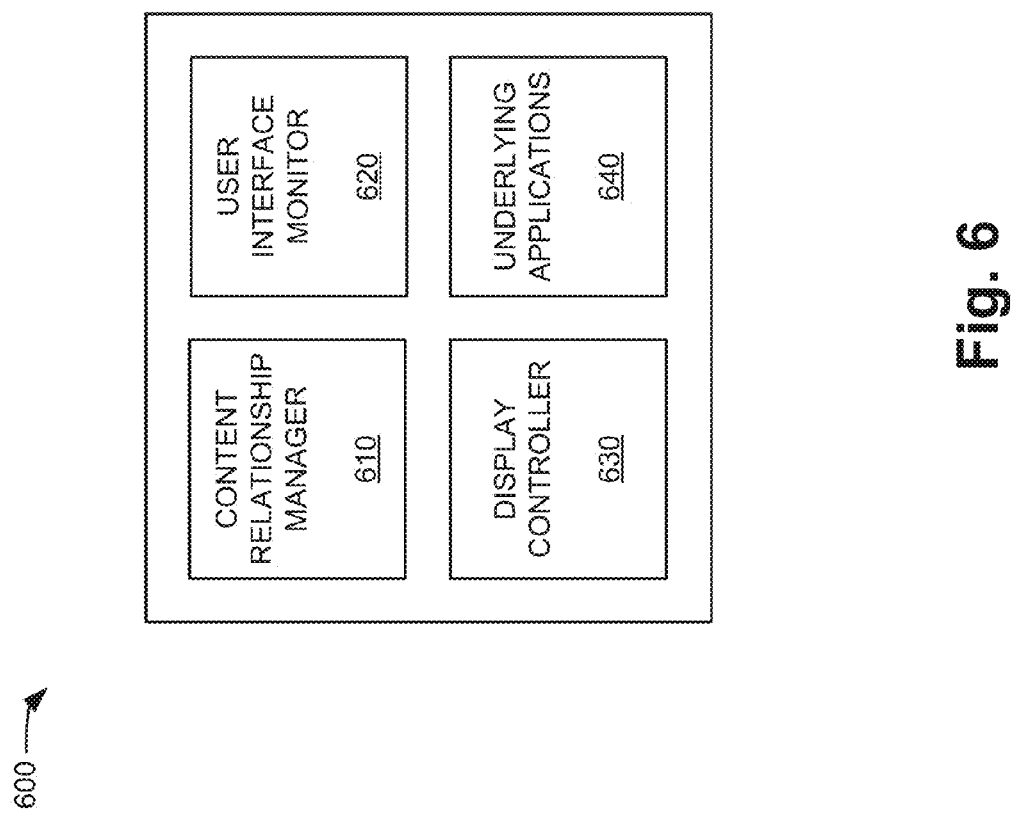
FIG. 6 is a block diagram of exemplary functional components of the user device illustrated in FIG. 4.

FIG. 6 is a block diagram of exemplary functional components 500 of user device 310 illustrated in FIG. 5. Functional components 600 may be implemented as hardware, computing instructions (e.g., software) tangibly embodied on a computer-readable medium, or a combination of hardware and computing instructions configured to perform one or more of the processes described herein. In certain embodiments, functional components 600 may be implemented as a software application embodied on a computer-readable medium, such as memory 510, configured to direct processor 500 to execute one or more of the processes described herein.

As shown in FIG. 6, user device 310 may include a content relationship manager 610, a user interface monitor 620, a display controller 630, and an underlying applications 640. User device 310 may also include other peripheral applications (not shown) associated with options that may be presented to users of user device 310. Peripheral applications may include, for example, a file manager application, an image viewing application, a camera application, a video player, an audio application, a global positioning system (GPS) application. Additionally, peripheral applications may also include various communication applications, such as, for example, an email application, an instant messaging (IM) application (such as, for example WhatsApp™, Yahoo!™ Messenger, etc.), a video conferencing application, voice communications over any protocol, including a Voice over Internet Protocol (VoIP) application, Voice over Long Term Evolution (VoLTE) application, Voice over Asynchronous Transfer Mode (VoATM) application, a multimedia messaging service (MMS) application, a short message service (SMS) application, etc.

Content relationship manager 610 may be configured to establish and/or identify relationships between content items, content options, applications, and/or user device state information. These relationships may identify appropriate content options (140/160) to present when contact navigation objects 120 are used to display content options (140/160). Additionally, content relationship manager 610 may also use relationships to identify appropriate contact navigation objects for presentation in contacts panel 135. The conditions needed to qualify as a "relationship" between content items may be defined in advance or may be defined and/or refined based on past user history. For example, the content relationship manager 610 may include or otherwise have access to a predefined relationship heuristic, which may include one or more conditions defining one or more relationships. When a set of one or more conditions for a relationship is satisfied, content relationship manager 610 may identify the existence of the relationship between content items, content options, applications, and/or device state information. Examples of relationships between content items, may include, but are not limited to, location based relationships, time based relationships, content type relationships, content source based relationships, content destination based relationships, and user based relationships. These examples are illustrative only, and may include any variations supported by metadata and/or device state information. The relationships and conditions for the relationships may be tailored as may suit a particular implementation or application for supporting GUI 100. The conditions may be implemented using logical constructs in software, firmware, and/or hardware.

In certain examples, a relationship may be defined to exist between content items when metadata associated with content items includes common metadata values. For example, a location based relationship between content instances may be determined to exist when location metadata values for the content items are at least substantially similar (to which the degree of similarity may be set as a default value or tolerance, or may be adaptively modified). For instance, two photographs created at a common location (e.g., the same geographic location or network address) may be determined to be related by location. Similarly, common metadata values for other components of metadata may be used to determine that other types of relationships exist. Examples of other metadata components may include, but are not limited to, time metadata, user metadata, content type metadata, and source and/or destination metadata. These metadata components may be used to determine whether time based, user based, content type based, content source based, and content destination based relationships exist between content items. An exemplary time based relationship may identify substantially concurrent performance of content management operations such as creation of content items at substantially the same time. An exemplary user based relationship may identify that content management operations were initiated by or otherwise associated with the same user or user profile. An exemplary content type based relationship may identify content instances that are of the same type (e.g., same predefined category or file type). An exemplary content source based relationship may identify that content instances have been received from a common source. An exemplary content destination based relationship may identify content instances that have been sent to a common destination.

In certain examples, common metadata values may refer to metadata values that are within a predefined threshold of one another. For example, a location based relationship between content instances may be determined to exist when location metadata values for the content instances are within a predefined maximum geographic distance threshold. For instance, two photographs created at locations that are geographically nearer to one another than the predefined maximum distance may be determined to be related by location. Similarly, predefined thresholds for metadata values for other components of metadata (e.g., a predefined maximum period of time between two time data values) may be used to define and determine that other relationships exist.

Conditions for relationships may be custom defined by the user. Content relationship manager 610 may be configured to provide one or more tools for custom definition of content relationships. The tools may be provided in any suitable way and may include any mechanism or process the user may utilize to custom define one or more conditions for a relationship. For example, content relationship manager 610 may be configured to generate and provide a GUI which provides one or more tools configured to enable the user to establish and/or modify conditions which define relationships (e.g., common metadata value thresholds). For instance, the user may be able to adjust a maximum distance threshold value to be used for identifying location based relationships. Similarly, the user may be able to adjust other relationship thresholds. In certain examples, the user may be able to select and deselect any particular metadata component for use or non-use in identifying relationships. For instance, the user may deactivate certain conditions in the predefined relationship heuristic such that content relationship manager 610 will not use the deactivated conditions when identifying relationships. As an example, the user may deactivate conditions for time based relationships for a particular content management operation (e.g., sending content) such that time based relationships for the content management operation will not be identified.

Content relationship manager 610 may be configured to identify relationships between content items at any suitable time. For example, content relationship manager 610 may be configured to identify relationships in accordance with a predefined schedule or frequency, or at off-peak times. Alternatively or additionally, content relationship manager 610 may be configured to identify relationships in response to the occurrence of a content management operation, such as when a new content instance is received and stored to memory 510. In certain embodiments, content relationship manager 610 may be configured to dynamically identify one or more relationships in response to a request for access to and/or retrieval of a content instance.

User interface monitor 620 may identify the timing and nature of commands provided to user device 310 for interaction with GUI 100. The functionality of user interface monitor 620 may support various types of user interface approaches, and thus would be able to support different hardware for a variety of user interface devices. For example, GUI 100 of user device 310 for which a user interacts with the content/contact navigation objects 120/150 and content options 140/160 may implement a touch interface. However, other known interfaces, such as, for example, mouse, track-pad, keyboard, gesture recognition, etc., may be used in various embodiments. For example, user interface monitor 620 may detect a touch on one of the content navigation objects 120, control tab 130, contact navigation objects 150, and/or content options 140/160 and subsequently identify the command so the appropriate action is performed. When touch display 430 detects an appropriate input (e.g., a slide action on a navigation content object 120), user interface monitor 620 may identify a particular command and subsequently generate a signal (e.g., to display controller 630) to present content options 140. When user interface monitor 620 detects a different command (e.g., a tap on a content option 140), user interface monitor 620 may generate another signal to implement an action associated with the content option.

Display controller 630 may generate icons for presenting content options 140/160. Display controller 630 may generate the options based on, for example, information retrieved from content relationship manager 610. For example, display controller 630 may receive a signal from user interface monitor 620 to present content options 140/

160. In response to the signal from user interface monitor 620, display controller 630 may retrieve, from content relationship manager 610, data to support generation of icons for the selected content option 140/160. Display controller 630 may generate the data-driven icons and/or text and may present the data-driven icons on GUI 100.

Underlying applications 640 may include one or more applications for which content navigation objects 120, contact navigation objects 150, and content options 140/160 may be associated, given the various applications' compatibility with the content items. In one implementation, for example, specific contact navigation objects 150 may be presented when a particular application is running in the foreground. Moreover, specific content options 160 may be presented based on the content items' compatibility with the foreground application and/or other applications. A content option may be used to quickly "switch" the applications (i.e., exit out of the foreground application and launch a different application) for a particular content item. For example, if messaging application is running in the foreground when contacts panel 135 is displayed, tapping on a contact navigation object 150 may open a text message to send to the selected contact. However, content options 160 may be displayed to select a different mode of communication than text messaging. For example, the contact may instead be contacted using a phone application if the user selects the phone icon from the content options 160.

Although FIG. 6 shows exemplary functional components of user device 310, in other implementations, user device 310 may contain fewer, different, differently-arranged, or additional functional components than depicted in FIG. 6. In still other implementations, a functional component of user device 310 may perform one or more tasks described as being performed by another functional component of user device 310.

Figure 7:
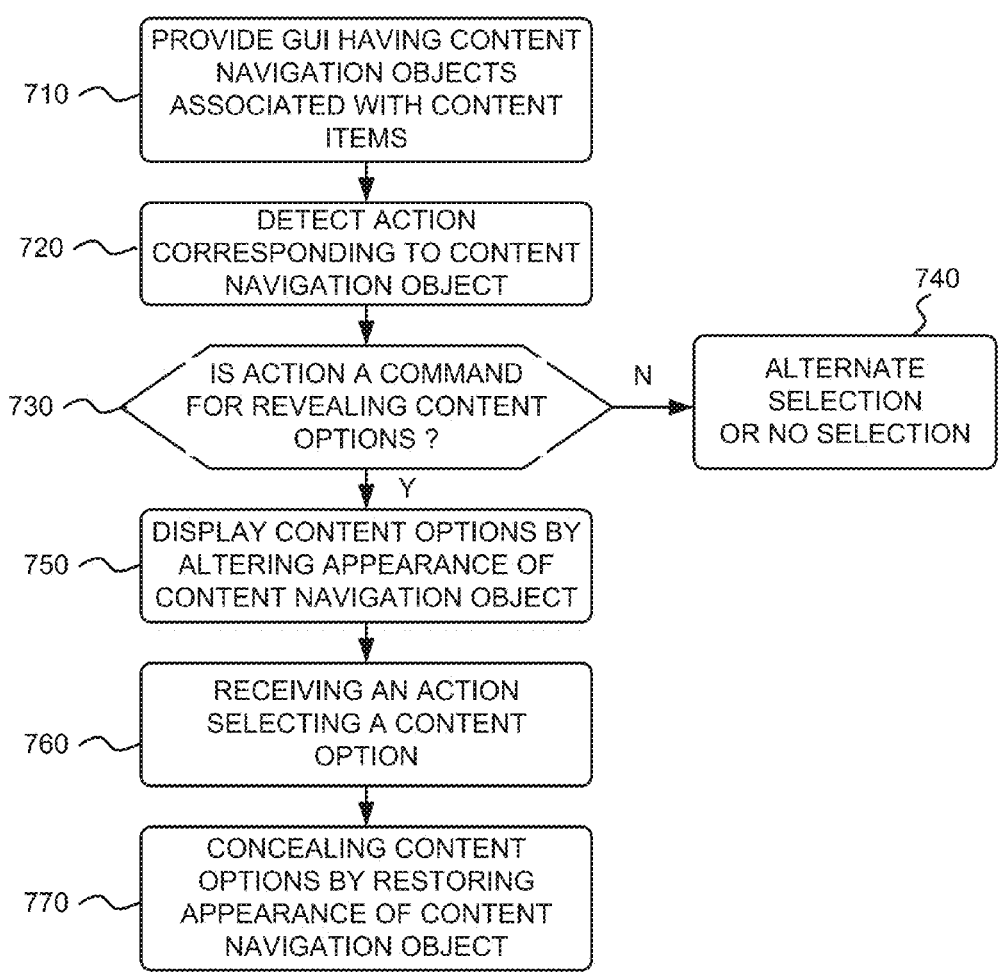
FIG. 7 is a flow diagram of an exemplary process for providing accessible contextual controls in a graphical user interface.

FIG. 7 is a flow diagram of an exemplary process 700 for providing accessible contextual controls in a graphical user interface. Process 700 may be performed by user device 310, for example, by executing instructions stored in memory 510 by processor 500.

Initially, user device 310 may provide a GUI which presents content/contact navigation objects 120/150 (Block 710). Each content/contact navigation object 120/150 may be associated with a content item and is presented within a portion of the GUI. Contact navigation objects 150 are special classes of content navigation objects 120, which are presented in contacts panel 135. The contact navigation objects are associated with content items that related to contact information (e.g., vCard files). User device 310 may detect an action that corresponds to selecting a content navigation object (Block 720). Detecting the action in Block 720 may include having user device 310 decode a command from a touch-screen display, a mouse, a track-pad, a keyboard, at least one camera, at least one microphone, and/or any type of gesture recognition device (e.g., an infrared or optical sensor). The action may correspond to any user input, such as, for example, a voice command, a mouse click, a keyboard press, a touch, a tapping and/or any gesture such as, for example, a sliding action, on a content/contact navigation object 120/150. Other gestures may include various touch commands in proximity to a content navigation object. The touch commands may include, for example, one or more taps, long presses, panning, flicking, etc.; multi-touch commands, such as, for example, multi-finger taps, multi-finger scrolls, pinching open, pinching closed, rotating, etc.; and drawing geometric shapes in proximity to the navigation content object, such as, for example, a circle, User device 310 may determine whether the detected action is a command to display content options 140/160 (Block 730), based on the type of action detected. The content options 140/160 that are presented may be contextually related to the content item associated with the content/contact navigation object 120/150. Having only contextually related content items displayed provides for a more compact and efficient interface for the user. If the detected action was determined as not being a command for displaying content/contact options 120/150, user device 310 performs the action for the alternate selection (Block 740). The alternate selection may be a command to launch a default application related to the content item associated with the content/contact navigation object 120/150. This alternate selection may be invoked using an action distinguishing it from an action associated with displaying a content option 120/160.

If user device 310 determines the detection action was a command to display content options 140/160, the GUI displays content options 120/160 by altering the appearance of content navigation object 120 (Block 750). In an embodiment, the content navigation object may have its appearance altered from a first state to a second state, where this altering may include displacing, rotating, flipping, morphing, and/or changing the size, aspect, color, and/or transparency of the content navigation object. The content options may be displayed in a number of different ways depending upon how the content navigation object is altered. For example, the content options may appear to be under the content navigation object as, for example, the content navigation object changes transparency or is moved from one position to another. Alternatively, the content options may be displayed on another side or dimension of the content navigation object if it is rotated (e.g., flipped) by the user.

User device 310 may receive an action selecting a content option from the displayed content options 140/160 (Block 760). The content option may be associated with a selectable action that may include, for example, saving the content item, deleting the content item, editing the content item, or forwarding the content item over at least one of an e-mail, a short message service (SMS), or a social network. The selectable actions may further include launching an application associated with the content item (e.g., an alternative application other than a default application), printing the content item, storing the content item in a cloud server.

Finally, user device 310 may conceal the content options 140/160 after the action for selecting the content option has been received. The content options may be concealed by restoring content/contact navigation object 120/150 to its unaltered appearance.

Figure 8:
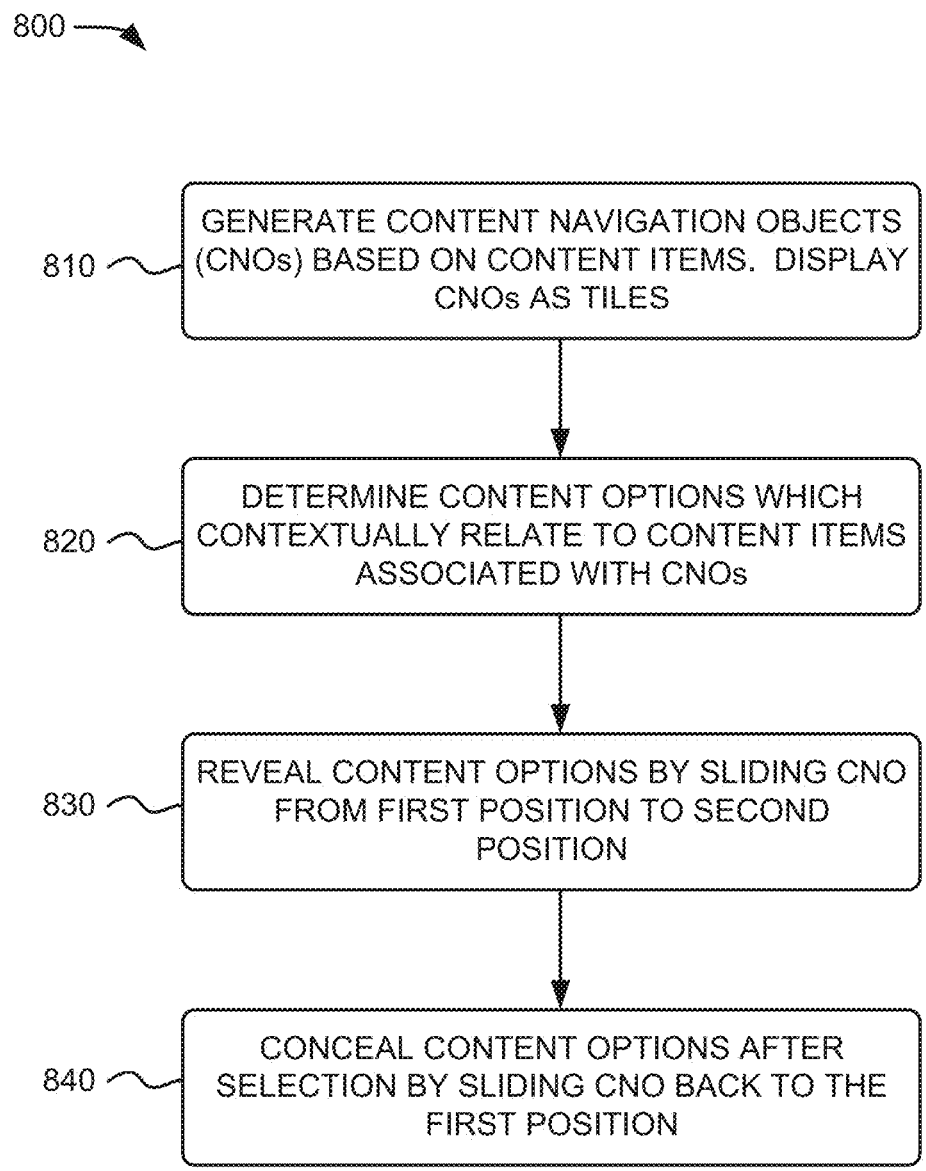
FIG. 8 is a flow diagram of an exemplary process for providing accessible contextual controls in a format associated with FIGS. 1A and 1B.

FIG. 8 is a flow diagram of an exemplary process 800 for providing accessible contextual controls in a format associated with FIGS. 1A and 1B. When providing GUI 100 that presents a plurality of content navigation objects 120, user device 310 may generate a graphical representation for each content navigation object 120 based on its associated content item. The content item may include, for example video data, image data, audio data, and/or text data. User device 310 may render graphical representations of the content navigation objects as two dimensional rectangles arranged as tiles on a display, such as the display illustrated in FIG. 1A (Block 810).

User device 310 may determine content options which contextually relate to the content item associated with content navigation object (CNO) 120 (Block 820). User device 310 may display content options 140 by sliding a content navigation object from a first position to a second position in accordance with the slide action, as illustrated in FIG. 1B

(Block 830). Content options 140 may be determined by having user device 310 identify selectable actions appropriate for the content item. The selectable options may include, for example, saving the content item, deleting the content item, editing the content item, or forwarding the content item over at least one of an e-mail, a short message service (SMS), or a social network. The user device 310 may identify selectable options by accessing metadata associated with the content item and identifying relationships based on pre-defined conditions related to the accessed metadata. After an action for selecting a content option is received, user device 310 may conceal content options 140 by sliding the navigation content object 120 back to the first position occupied prior to receiving the touch (Block 840).

Figure 9:
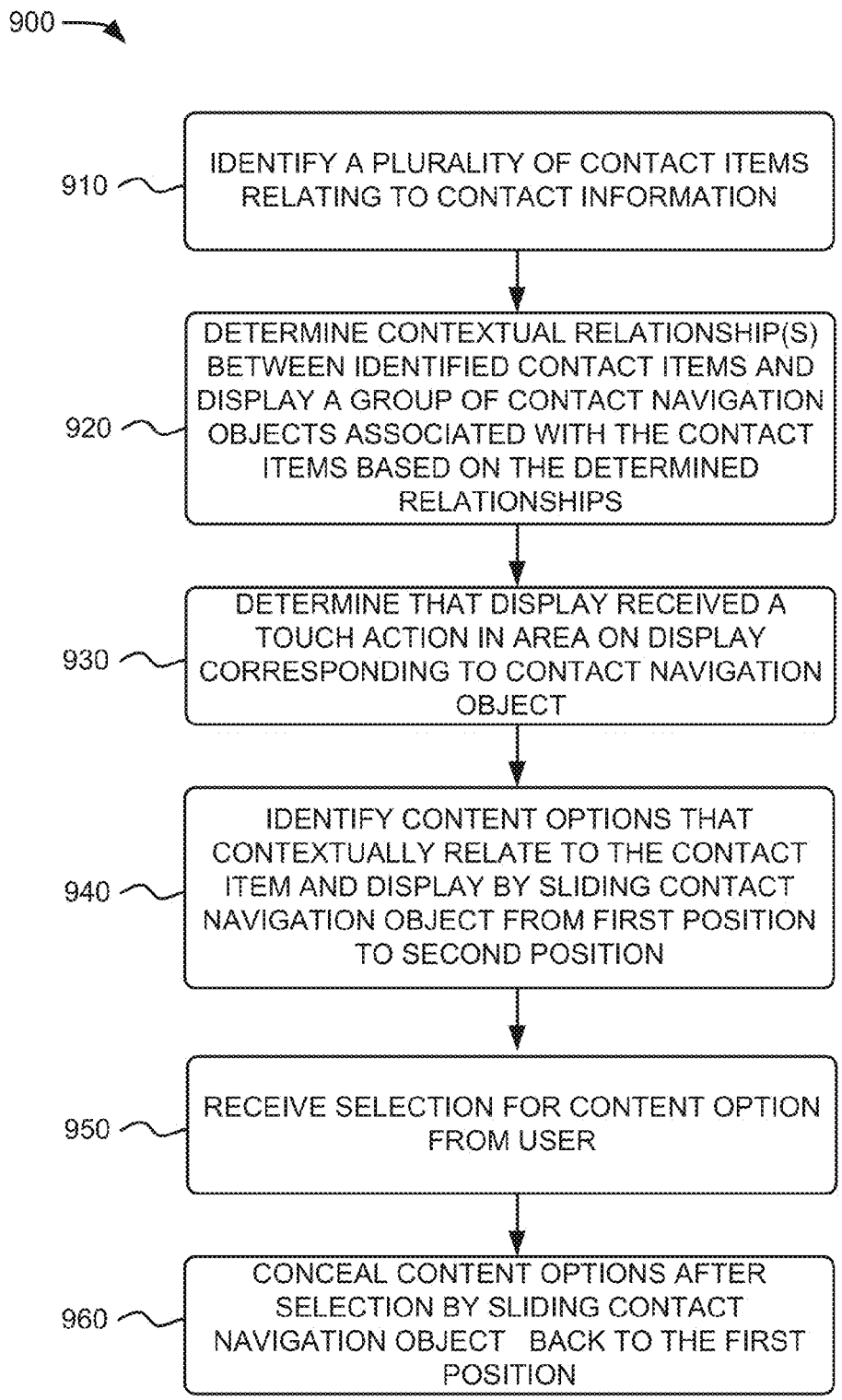
FIG. 9 is a flow diagram of an exemplary process for providing accessible contextual controls in a format associated with FIGS. 2A and 2B.

FIG. 9 is a flow diagram of an exemplary process 900 for providing accessible contextual controls in a format associated with FIGS. 2A and 2B.

When user device 310 generates GUI 100 having a contacts panel 135, user device 310 may identify a plurality of contact items (i.e., content items relating to contact information) (Block 910). In an embodiment, the identifying may involve user device 310 determining a group of contact items that are associated with a common communication application The common communications application may include a phone application, a Voice over Internet Protocol (VoIP) application, a video conferencing application, a text messaging application, a multimedia messaging application, and/or a voice mail application.

User device 310 may determine at least one contextual relationship between the identified contact items and present a group of contact navigation objects 150 based on determining at least one contextual relationship between the identified contact items (Block 910). Contact navigation objects 150 are content navigation objects 120 associated with the identified contact items, and may include a graphical and/or text representation identifying the contact information.

User device 310 may determine at least one contextual relationship between the identified contact items by accessing metadata associated with the contact items, determining state information of user device 310, and/or analyzing at least one of the metadata or the state information for conditions defining a contextual relationship (Block 920). User device 310 may access metadata by obtaining metadata identifying at least one of a personal relationship status, a business relationship status, a family relationship status, a location status, a temporal status, or a content source status associated with each of the identified content items relating to contact information. In some instances, user device 310 may access or receive metadata from data center 320 (shown in FIG. 3).

User device 310 may determine that display 430 received a touch in an area on display 430 corresponding to a contact navigation object 150 (Block 930). The touch may be detected to determine an action which corresponds to the contact navigation object, and thus the contact item. For example, a tap on a contact navigation object 150 may launch a default communications application to establish a preferred mode of communication with the entity (person, organization, etc.) represented by contact item. An alternative touch on the contact navigation object 150 (e.g., a slide action) may be detected as a different command which may correspond to an action to display content options 160.

User device 310 may then identify the content options 160 which contextually relate to the contact item, and display the identified content options 160 by, for example, sliding contact navigation object 150 from a first position to a second position in accordance with the slide action as illustrated in FIG. 2B (Block 940). The content options 160 may correspond to selectable actions appropriate for the contact item. The selectable actions may include deleting the contact item, editing the contact item, indicating the contact item is a favorite, printing the contact item, forwarding the contact item, and/or storing the contact item in a cloud server. The selectable actions may further include launching an application which is an alternative to a default communications application associated with the contact item. The alternative application includes at least one of an e-mail application, a short message service (SMS) application, a multimedia messaging service (MMS) application, a social networking application, an instant messaging (IM) application, a video conferencing application, voice communications application over any protocol, including a Voice over Internet Protocol (VoIP) application, Voice over Long Term Evolution (VoLTE) application, or a Voice over Asynchronous Transfer Mode (VoATM) application.

User device 310 may display content options 160 which contextually relate to the contact item associated with the contact navigation object 150. User device 310 may receive a selection by the user for a content option 160 (Block 950). User device 310 may conceal content options 160 by sliding contact navigation object 150 back to the first position (Block 960).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 7-9, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code. It being understood that software and control hardware can be designed to implement these aspects based on the description herein.

Further, certain portions of the invention may be implemented as a "component" or "system" that performs one or more functions. These components/systems may include hardware, such as a processor, an ASIC, a FPGA, or other processing logic, or a combination of hardware and software.

To the extent the aforementioned embodiments collect, store or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
providing, on a mobile user device, a graphical user interface that presents a plurality of content navigation objects,
wherein each content navigation object is associated with a content item and is presented within a portion of the graphical user interface,
wherein each content navigation object is displayed as a representation of the associated content item for identification of the content item by a user,
wherein the associated content item is a contact stored in memory,
wherein the plurality of content navigation objects includes a first plurality of content navigation objects that are displayed when a current time is within a particular time span, and
wherein the plurality of content navigation objects includes a second plurality of content navigation objects that are displayed when the current time is not within the particular time span;
detecting an action that corresponds to a content navigation object from the first or second plurality of content navigation objects displayed at the current time;
determining that the detected action is a command to display content options, wherein the content options are contextually related to the content item associated with the content navigation object, and wherein each content navigation object has a plurality of content options;
determining particular content options to display from the plurality of content options associated with the content navigation object based on metadata associated with the content item and state information of the mobile user device,
wherein the metadata includes information identifying whether the contact associated with the content item is a work contact or not a work contact, and
wherein the state information of the mobile user device includes the current time, and wherein determining the particular content options to display includes:
determining first particular content options to display when the current time is within the particular time span and the contact is a work contact,
determining second particular content options to display when the current time is within the particular time span and the contact is not a work contact,
determining third particular content options to display when the current time is not within the particular time span and the contact is a work contact, and
determining fourth particular content options to display when the current time is not within the particular time span and the contact is not a work contact,
wherein each particular content option from the determination is distinct from each other;
displaying the particular content options by altering the appearance of the content navigation object without displaying all of the plurality of content options associated with the content navigation object;
receiving an action selecting a content option from the displayed particular content options; and
concealing the particular content options after the action for selecting the content option has been received.

2. The method of claim 1, wherein detecting the action that corresponds to a content navigation object further comprises:
decoding a command received by at least one of a touch-screen display, a mouse, a track-pad, a keyboard, at least one camera, a voice command from a microphone, or a gesture recognition device.

3. The method of claim 1, wherein detecting the action that corresponds to a content navigation object further comprises:
determining that the detected action is a command to launch a default application related to the content item associated with the content navigation object.

4. The method of claim 1, wherein providing a graphical user interface that presents a plurality of content navigation objects comprises:
generating a graphical representation for each content navigation object based on its associated content item;
rendering the graphical representations of the content navigation objects as selectable tiles; and
arranging the selectable tiles on a display.

5. The method of claim 1, wherein detecting an action that corresponds to the content navigation object comprises:
determining that a display received a touch in an area on the display corresponding to the content navigation object; and
determining whether the detected action is a touch command to display content options.

6. The method of claim 5, wherein determining whether the detected action is a touch command further comprises:
determining that the touch includes any touch gesture comprising at least one of a slide action, one or more taps, or a drawing of a geometric shape in proximity to the content navigation object.

7. The method of claim 1, wherein displaying the particular content options by altering the appearance of the content navigation object comprises:
determining particular content options which contextually relate to the content item associated with the content navigation object; and
altering the appearance of the content navigation object from a first state to a second state in accordance with the action, wherein the altering includes at least one of displacing, rotating, flipping, morphing, or changing a size, aspect, color or transparency of the content navigation object.

8. The method of claim 7, wherein altering the appearance of the content navigation object comprises:
sliding the content navigation object from a first position to a second position in accordance with a slide action.

9. The method of claim 7, wherein determining the particular content options which contextually relate to the content item comprises:
identifying particular content options corresponding to selectable actions appropriate for the content item, wherein the selectable actions include at least one of saving or downloading the content item, deleting the content item, editing the content item, forwarding the content item over at least one of an e-mail, a short message service (SMS), or a social network, launching an application, printing the content item, or storing the content item in a cloud server.

10. The method of claim 9, wherein identifying the particular content options corresponding to selectable actions appropriate for the content item comprises:
   identifying relationships based on pre-defined conditions related to the metadata.

11. The method of claim 1, wherein receiving an action selecting a content option comprises determining that a display received a touch in an area on the display corresponding to the selected content option; and
   wherein concealing the particular content options after the action for selecting the content option has been received comprises returning the content navigation object to a state corresponding to a state prior to receiving the touch.

12. The method of claim 1, wherein providing the graphical user interface comprises:
   identifying a plurality of contact items, wherein a contact item is a content item relating to contact information;
   determining at least one contextual relationship between the identified contact items; and
   presenting a group of contact navigation objects based on determining at least one contextual relationship between the identified contact items, wherein the contact navigation objects are content navigation objects associated with the identified contact items.

13. The method of claim 12, wherein identifying a plurality of contact items comprises:
   determining a group of contact items that are associated with a common communications application, wherein the common communications application includes at least one of a phone application, voice communications over network protocols, including a Voice over Internet Protocol (VoIP) application, a Voice over Long Term Evolution (VoLTE) application, a Voice over Asynchronous Transfer Mode (VoATM) application, a video conferencing application, a text messaging application, a multimedia messaging application, or a voice mail application.

14. The method of claim 12, wherein identifying a plurality of contact items comprises:
   generating the plurality of contact items from at least one of information stored on the mobile user device or information received from a data center.

15. The method of claim 12, wherein determining at least one contextual relationship between the identified contact items comprises:
   accessing metadata associated with the identified contact items;
   determining the state information of the mobile user device; and
   analyzing at least one of the metadata or the state information for conditions defining a contextual relationship.

16. The method of claim 15, wherein accessing metadata associated with the identified contact items comprises:
   obtaining metadata identifying at least one of a personal relationship status, a business relationship status, a family relationship status, a location status, a temporal status, or a content source status associated with each of the identified contact items.

17. The method of claim 15, wherein determining the state information of the mobile user device comprises:
   obtaining information provided by the mobile user device which includes at least one of time information, position information, velocity information, or information produced by a sensor including at least one of a camera or a microphone.

18. The method of claim 12, wherein determining at least one contextual relationship between the identified contact items comprises:
   defining conditions based on prior usage history, wherein prior usage history includes at least one of logs of communications applications or address books, wherein the address books are stored on at least one of the mobile user device or a data center.

19. The method of claim 12, wherein each contact navigation object includes at least one of a graphical or text representation identifying the contact information, the method further comprising:
   determining that a display received a touch in an area on the display corresponding to a first contact navigation object from the group of contact navigation objects; and
   detecting an action that corresponds to the first contact navigation object.

20. The method of claim 19, wherein detecting the action that corresponds to the first contact navigation object further comprises:
   determining that the detected action is a command to launch a default communications application related to the content item associated with the first contact navigation object.

21. The method of claim 19, further comprising:
   determining whether the detected action is a command to display content options, wherein the content options are contextually related to the content item associated with the first contact navigation object;
   moving the first contact navigation object from a first position to a second position in accordance with the action; and
   displaying content options which contextually relate to the contact item associated with the first contact navigation object.

22. The method of claim 21, further comprising:
   identifying content options corresponding to selectable actions appropriate for the contact item,
   wherein the selectable actions include at least one of deleting the contact item, editing the contact item, indicating the contact item is a favorite, printing the contact item, forwarding the contact item, or storing the contact item in a cloud server, and
   wherein the selectable actions include at least one of launching an alternative to a default communications application associated with the content navigation object, wherein the alternative application includes at least one of an e-mail application, a short message service (SMS) application, a multimedia messaging service (MMS) application, a social networking application, an instant messaging (IM) application, a video conferencing application, voice communications application over any protocol, including a Voice over Internet Protocol (VoIP) application, Voice over Long Term Evolution (VoLTE) application, or a Voice over Asynchronous Transfer Mode (VoATM) application.

23. A mobile user device, comprising:
   a display;
   a memory to store instructions; and
   a processor, coupled to the memory and the display, configured to execute the instructions stored in memory to:

provide a graphical user interface that presents a plurality of content navigation objects,
wherein each content navigation object is associated with a content item and is presented within a portion of the graphical user interface,
wherein each content navigation object is displayed as a representation of the associated content item for identification of the content item by a user,
wherein the associated content item is a contact stored in memory,
wherein the plurality of content navigation objects includes a first plurality of content navigation objects that are displayed when a current time is within a particular time span, and
wherein the plurality of content navigation objects includes a second plurality of content navigation objects that are displayed when the current time is not within the particular time span,
detect an action that corresponds to a content navigation object from the first or second plurality of content navigation objects displayed at the current time,
determine that the detected action is a command to display content options, wherein the content options are contextually related to the content item associated with the content navigation object, and wherein each content navigation object has a plurality of content options,
determine particular content options to display from the plurality of content options associated with the content navigation object based on metadata associated with the content item and state information of the mobile user device,
wherein the metadata includes information identifying whether the contact associated with the content item is a work contact or not a work contact, and
wherein the state information of the mobile user device includes the current time, and
wherein, when determining the particular content options to display, the processor is further configured to:
  determine first particular content options to display when the current time is within the particular time span and the contact is a work contact,
  determine second particular content options to display when the current time is within the particular time span and the contact is not a work contact,
  determine third particular content options to display when the current time is not within the particular time span and the contact is a work contact, and
  determine fourth particular content options to display when the current time is not within the particular time span and the contact is not a work contact,
  wherein each particular content option from the determination is distinct from each other,
display the particular content options by altering the appearance of the content navigation object without displaying all of the plurality of content options associated with the content navigation object,
receive an action selecting a content option from the displayed particular content options, and
conceal the content options after the action for selecting the content option has been received.

24. The mobile user device of claim 23, wherein the mobile user device comprises one of a tablet computer, a smart phone, a video or portable gaming system, a music player, or a global positioning system (GPS) unit.

25. A non-transitory computer-readable medium comprising instructions, which, when executed by a processor, cause the processor to:
provide, on a mobile user device, a graphical user interface that presents a plurality of content navigation objects,
wherein each content navigation object is associated with a content item and is presented within a portion of the graphical user interface,
wherein each content navigation object is displayed as a representation of the associated content item for identification of the content item by a user,
wherein the associated content item is a contact stored in memory,
wherein the plurality of content navigation objects includes a first plurality of content navigation objects that are displayed when a current time is within a particular time span, and
wherein the plurality of content navigation objects includes a second plurality of content navigation objects that are displayed when the current time is not within the particular time span;
detect an action that corresponds to a content navigation object from the first or second plurality of content navigation objects displayed at the current time;
determine that the detected action is a command to display content options, wherein the content options are contextually related to the content item associated with the content navigation object, and wherein each content navigation object has a plurality of content options;
determine particular content options to display from the plurality of content options associated with the content navigation object based on metadata associated with the content item and state information of the mobile user device, wherein the metadata includes information identifying whether the contact associated with the content item is a work contact, wherein the state information of the mobile user device includes the current time, and wherein the instructions further include instructions that cause the processor to:
  determine first particular content options to display when the current time is within the particular time span and the contact is a work contact or not a work contact,
  determine second particular content options to display when the current time is within the particular time span and the contact is not a work contact,
  determine third particular content options to display when the current time is not within the particular time span and the contact is a work contact, and
  determine fourth particular content options to display when the current time is not within the particular time span and the contact is not a work contact,
  wherein each particular content option from the determination is distinct from each other;
display the particular content options by altering the appearance of the content navigation object without displaying all of the plurality of content options associated with the content navigation object;
receive an action selecting a content option from the displayed particular content options; and
conceal the content options after the action for selecting the content option has been received.

* * * * *